United States Patent [19]

Vaughn

[11] Patent Number: 5,042,201
[45] Date of Patent: Aug. 27, 1991

[54] ONE-PIECE WEATHERSTRIP WITH CONSTANT CROSS-SECTION AT CORNER BENDS

[75] Inventor: Robert A. Vaughn, Dearborn, Mich.
[73] Assignee: The Standard Products Company, Cleveland, Ohio
[21] Appl. No.: 553,873
[22] Filed: Jul. 16, 1990

Related U.S. Application Data

[63] Continuation-in-part of Ser. No. 466,998, Jan. 18, 1990, Pat. No. 4,949,507.

[51] Int. Cl.$^5$ .............................................. E06B 7/16
[52] U.S. Cl. ........................................ 49/482; 49/479; 49/491; 49/441
[58] Field of Search .................. 49/482, 491, 377, 479, 49/374, 440, 441

[56] References Cited

U.S. PATENT DOCUMENTS

| | | | |
|---|---|---|---|
| 3,448,550 | 6/1969 | Herr et al. | 49/440 X |
| 4,442,634 | 4/1984 | Kimura | 49/377 X |
| 4,656,784 | 4/1987 | Brachmann | 49/374 X |
| 4,696,128 | 9/1987 | Fukuhara | 49/377 X |
| 4,817,336 | 4/1989 | Kisanuki | 49/479 X |
| 4,843,763 | 7/1989 | Mesnel | 49/491 X |
| 4,949,507 | 8/1990 | Vaughan | 49/482 |

Primary Examiner—Philip C. Kannan
Attorney, Agent, or Firm—Harness, Dickey & Pierce

[57] ABSTRACT

A belt weatherstrip adapted to engage an end flange of a vehicle for operative sealing between a glass window and a vehicle surface. The flange of the vehicle has an inner surface and an outer surface. The belt weatherstrip is expandable to accommodate adaptability to various vehicle surface contours by allowing expendability of the width of the weatherstrip.

The belt weatherstrip includes an elongated core substrate which has an inner flange portion for abutting the inner surface of the flange and includes an outer flange portion and intermediate portion connecting the inner flange portion with the outer flange portion and a plurality of clips for securing the elongated core substrate to the end flange. An elastomeric sealing lip member is attached to the flange portion for allowing slideable sealing engagement between the flange and a glass pane. The intermediate portion includes a bend therein in its normal position wherein the bend may be selectively straightened to expand the width of the weatherstrip for accommodating varying final application in a vehicle.

A glass run weatherstrip having a bend in its intermediate leg is also provided for traversing corners of a door window aperture.

3 Claims, 6 Drawing Sheets

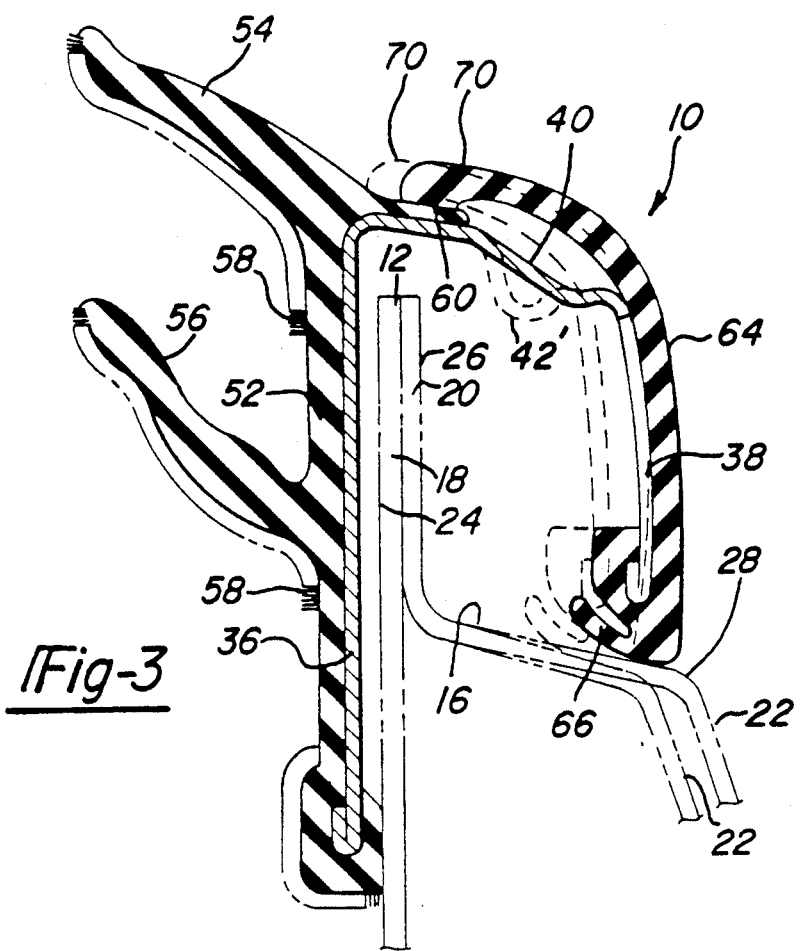
_Fig-3_
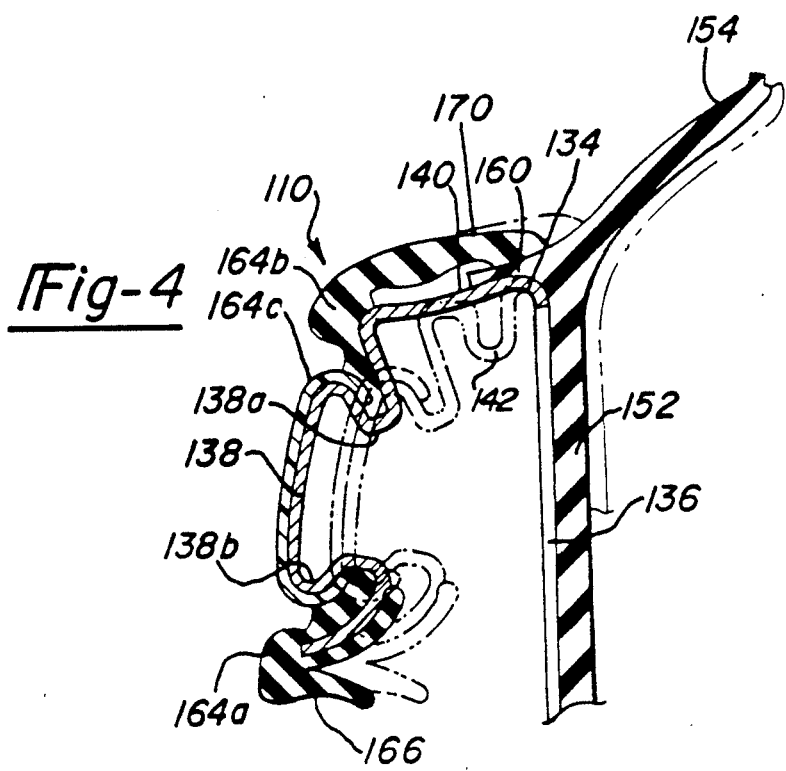
_Fig-4_

ONE-PIECE WEATHERSTRIP WITH CONSTANT CROSS-SECTION AT CORNER BENDS

This application is a continuation-in-part of U.S. Ser. No. 466,998, now U.S. Pat. No. 4,949,507, filed Jan. 18, 1990, entitled "One-Piece Expandable Weatherstrip".

BACKGROUND

The present invention relates to a belt weatherstrip and a glass run weatherstrip for a vehicle. More particularly, the present invention relates to a belt weatherstrip or the like which seals the portion of a vehicle between the sliding glass window and the show surface of a vehicle door, for instance.

Belt weatherstrips of the past have generally been utilized to weather-strip sheet metal flange areas of a vehicle, such as found in a vehicle door, for instance, which has a spot welded end flange connecting the outer show surface portion with the inner frame portion of the door. Such weatherstrips commonly include a sealing lip for sealing and stripping water off the glass window and an overhanging elastomeric strip portion which engages the outer show surface of the car door in order to prevent water from entering the flange area.

It is desired in such constructions to provide a strip show surface of the weatherstrip which may include either a colored elastomer strip or chrome strip or the like which aesthetically matches the finishing contours of the vehicle surface, in order to produce a matched fit. In many vehicle designs a transition edge is formed near the flange which becomes a transition point from the weatherstrip show surface to the vehicle door show surface. Such edges generally are not parallel to the flange portion but have certain contours or may taper depending on the design of the vehicle body and doors. Thus, in the past it was necessary to provide separate constructions which would exactly match the particular application depending on the width of the necessary overlying surface.

It is desired that such a belt weatherstrip will blend in with the design of the vehicle body and form a generally continuous surface at the transition edge into the vehicle door or the like. This was accomplished, in past constructions, by manufacturing a belt weatherstrip in accordance with the particular tolerances of the particular application. For instance, in prior constructions a belt weatherstrip core and show surface were manufactured to a particular specification. After the manufacture of this portion a separately manufactured glass sealing lip member was attached by staples or the like to the first portion and the belt weatherstrip was then assembled onto the vehicle end flange.

Thus, these prior belt weatherstrips were relatively expensive to manufacture since the tooling and manufacturing equipment used must be changed for each particular vehicle model design. Additionally, such prior belt weatherstrip constructions required a two-step process for attaching the sealing lip portion to the belt weatherstrip core portion thus, adding to the cost of labor involved in assembling the belt weatherstrip.

Therefore, it has been a goal in the art to provide a one-piece belt weatherstrip which would be suitable in such applications, thereby saving the costs of separate operations during manufacture thereof. It has also been a goal in the art to provide a belt weatherstrip which can be adapted to varying contours or transition tapers of the show surface of a vehicle without requiring separate tooling or manufacture thereof. Such a construction would provide for reduced costs in tooling and manufacture of the part resulting in more efficient utilization of resources and costs savings in both manufacture and sales of the part.

It has been an additional problem in the art that when providing a glass run weatherstrip for a window aperture of a vehicle it is sometimes necessary to traverse a corner of the window aperture. In the past this was accomplished by angular bending of a weatherstrip. It was sometimes necessary to thereafter restrike the glass run weatherstrip in order to provide proper clearance for the vehicle window at the bend in the weatherstrip.

Thus, it has been a goal in the art to provide a glass run weatherstrip which can be formed with a suitable angular bend to traverse a corner of a vehicle window aperture without the necessity of restriking the glass run weatherstrip.

Additionally, in some corner bend applications, where glass clearance is not particularly a problem, it has been desirable to provide a constant cross-section for a glass run strip about the corner. This has been attempted in the prior art by stretching of the metal in its longitudinal direction at the bend. This is problematic due to the fact that the weatherstrips formed sometimes have a reduced size or distortion in its cross-section at the corner bend. Also, because of this reformation the metal at the corner bend may be weakened. Thus, it has been a goal to provide a glass run construction which can be easily formed to provide a constant cross-section at a corner bend.

SUMMARY OF THE INVENTION

According to the present invention there is provided a weatherstrip adapted to engage an end flange of a vehicle for operative sealing between a glass window and a vehicle surface. The flange of the vehicle has an inner surface and an outer surface. The belt weatherstrip of the present invention is adjustable to accommodate adaptability to various vehicle surface contours by allowing adjustability of the width of the weatherstrip.

The belt weatherstrip includes an elongated core substrate which has an inner flange portion for abutting the inner surface of the flange and includes an outer flange portion and intermediate portion connecting the inner flange portion with the outer flange portion and a means for securing the elongated core substrate to the end flange. An elastomeric sealing lip member is attached to the flange portion for allowing slideable sealing engagement between the flange and a glass pane. The intermediate portion includes a bend formed therein in its normal position wherein the bend may be selectively straightened to expand the width of the weatherstrip for accommodating varying final applications in a vehicle. In the process of the present invention the bend may be formed in an intermediate leg of the weatherstrip to adjust the width of the weatherstrip along its length for accommodating a particular application.

A weatherstrip or glass run construction of the present invention can also be advantageously used to provide an improved construction at a corner bend due to excess material in the intermediate leg which can be useable for forming the corner bend.

It is therefore an object of the present invention to provide a one-piece belt weatherstrip for an end flange of a vehicle.

It is still further an object of the present invention to provide a one-piece belt weatherstrip which may be adjustable in its width to accommodate for various contours of a vehicle depending on a particular application.

It is still further an object of the present invention to provide a constant cross-section throughout the length of the weatherstrip or glass run strip including at any corner bends.

Other advantages of the present invention will be readily appreciated as same becomes better understood by reference to the following description when considered in connection with the accompanying drawings.

BRIEF DESCRIPTION OF THE DRAWINGS

In the accompanying drawings:

FIG. 3 is a sectional view taken along the line 3—3 of FIG. 1 showing the weatherstrip in its expanded position;

FIG. 4 is a detailed sectional view of an alternate embodiment of a belt weatherstrip made in accordance with the teachings of the present invention wherein a contoured show surface is provided and showing the normal position in phantom;

DETAILED DESCRIPTION OF THE PREFERRED EMBODIMENTS

Figure 1:
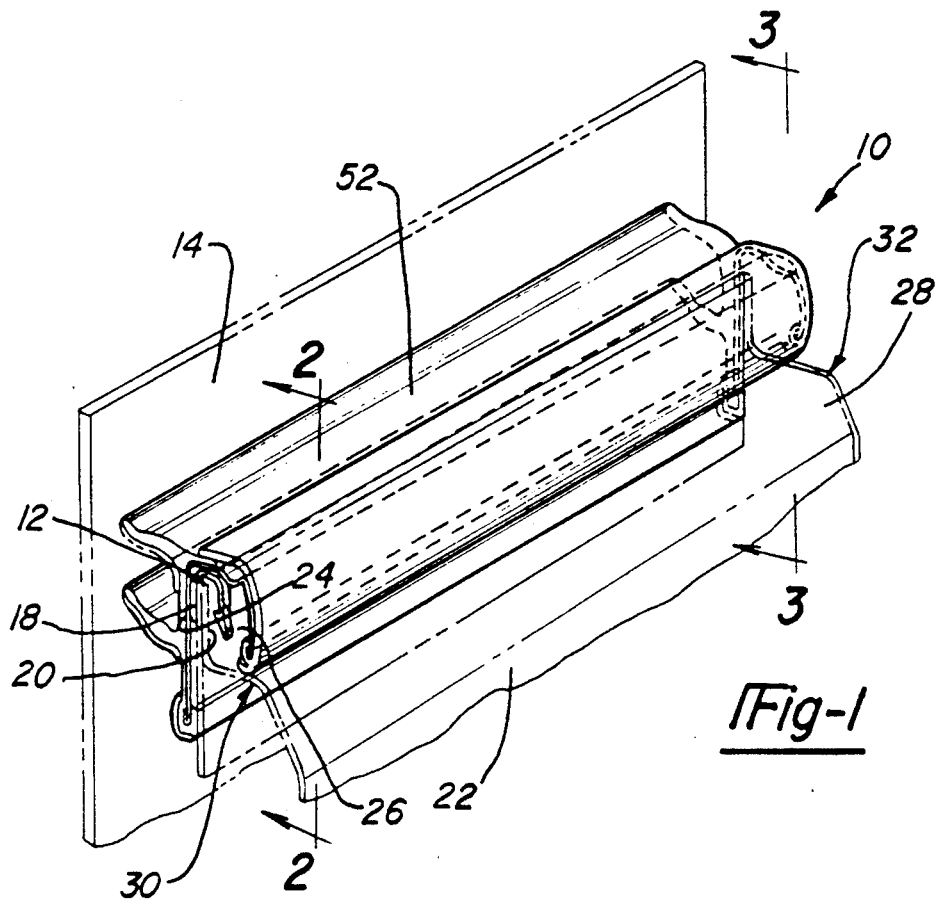
FIG. 1 is a detailed perspective view of the belt weatherstrip of the present invention partially in phantom showing the one-piece nature and the expandability of a belt weatherstrip made in accordance with the teachings of the present invention.
Figure 2:
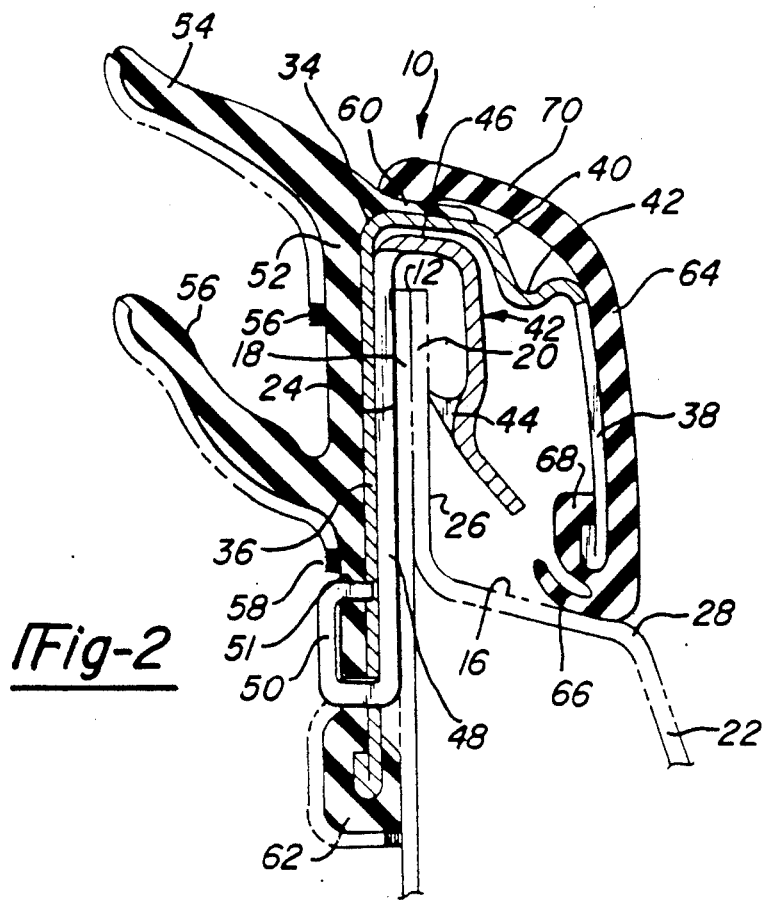
FIG. 2 is a detailed sectional view taken along line 2—2 of FIG. 1 showing the belt weatherstrip in its normal non-expanded position.

Referring now to the drawings and more specifically to FIGS. 1, 2 and 3, in accordance with the present invention there is provided a belt weatherstrip generally shown at 10. The weatherstrip 10 is adapted to engage an end flange 12 of a vehicle for sealing between a glass window 14 and a vehicle surface 16. The end flange 12 is generally made up of an inner sheet metal member 18 and an outer sheet metal member 20 which are welded together at flange 12. The outer sheet metal member 20 is configured as part of the outer body shape of the vehicle, such as a door, and includes an outer show surface 22 which is the finished exterior of the vehicle. The flange 12 includes an inner surface 24 and an outer surface 26. The inner surface 24 faces toward the glass channel of window 14 and the outer surface 26 is adjacent the show surface 22.

It is typical in the vehicle construction to have a transition portion 28 which connects the show surface of the vehicle body with the portions forming the flange 12. Such a transition portion may be a bend of varying taper or contour with respect to the flange 12. As shown in FIG. 1, the transition portion 28 is tapered such that it is narrower at a first end 30 and widens out such that it is tapered to the second end 32. Weatherstrip 10 of the present invention is expandable to accommodate and adapt to various transition areas or contours of the door without requiring special tooling and the like.

The weatherstrip of the present invention includes an elongated core substrate 34. The elongated core substrate 34 includes a flange portion 36, a show surface attachment portion 38 and an intermediate portion 40. The flange portion 36 is configured for placement adjacent the inner surface 24 of the flange 12. The intermediate portion 40 connects the show surface portion 38 with the flange portion 36.

The weatherstrip of the present invention also includes a means 42 for securing the elongated core substrate to the end flange 12. As shown in FIG. 2, this means for securing is accomplished by a spring clip which includes a spring loaded biting portion 44, a generally "U" shaped spring portion 46 and a main leg 48. The spring clip is attached to the core substrate 34 by way of grooves formed therein wherein the securement portion 50 interfits and locks by way of the springed leg member 51, as is commonly known in the art. Of course, other types of spring clips and/or rubber or plastic retention lips or clips with various types of securement methods may be utilized without deviating from the scope of the present invention.

A sealing lip member 52 is attached to the flange portion 36 of the core substrate 34. The sealing lip member 52 includes sealing lip portions 54 and 56 which have a flocking or slip coating 58 on their outer surface for engaging the glass surface of a vehicle door window, for instance, to provide for water sealing and stripping action as is commonly known in the art. It is preferred to have a pair of sealing lip portions, as shown in the Figures, however, one sealing lip member may be sufficient depending upon the application. The sealing lip member 52 includes a transversely extending tongue member 60. The tongue member 60 extends over and covers a portion of the intermediate portion 40 of the core substrate 44.

The sealing lip member 52 is attached to the flange portion 36 mechanically at its lower end by the generally "U" shaped configuration 62. Preferably, the lip member 52 is also extruded onto the core substrate for attachment thereto, however, other methods of attaching it may be utilized, such as adhesives and the like, which are readily known to those skilled in the art. The sealing lip member 52 is preferably made of an elastomeric material, such as an EPDM rubber or the like, which are commonly used in the art for this purpose.

A show surface member 64 is attached to the show surface portion 38 of the core 34. The show surface member 64 includes a lower end with a sealing lip 66 extending in a direction toward the end flange 12. The sealing lip 66 sealingly engages the surface 16 and provides an aesthetically pleasing transition from the show surface member 64 of the weatherstrip 10 onto the show surface of the vehicle 22 at the transition portion 28. The show surface member 64 of the weatherstrip is similarly mechanically attached by the overlapping end 68 and preferably is also extruded onto the show surface attachment portion 38 of the core substrate 34. The show surface member 64 includes extending portion 70 which overlaps and contacts the tongue 60 to sealingly engage therewith. The extending portion 70 of the show surface member 64 is unsecured to the core substrate and is slideable along the tongue 60, as will be described more particularly below.

The intermediate portion 40 of the core substrate 34 includes a bend 42 of a predetermined configuration formed along its longitudinal length thereof. The bend 42 of the intermediate portion 40 is preferably of an inward nature (i.e., away from the show surface portion) such that it does not interfere with the aesthetic appeal of the show surface member 64. However, the weatherstrip of the present invention would also function if the bend 42 is formed in an upward direction. Other configurations of the bend 42 may be utilized without deviating from the scope of the present invention provided there is an excess of material which can be utilized for adjusting the width of the weatherstrip. In operation, the bend 42 is arcuate in nature and may be selectively straightened to extend the show surface portion 38 of the core 36 in a direction away from the outer surface 26 of the flange 12 to accommodate varying contours of the vehicle show surface or the transition portion 28 of a vehicle door, for instance.

Thus, as shown in FIG. 1, if a tapered transition surface is to be adapted to, the bend 42 of the weatherstrip 10 may be left in its normally retracted position on the first end 30 and may be straightened in order to extend the weatherstrip to the expanded position, at the end 32. This is more particularly shown in FIG. 3 wherein the bend 42 is shown in phantom and may be straightened to provide the extended position shown in solid lines in FIG. 3. Thus, in operation, the portion 70 of the show surface will slide along the tongue portion 60 in order to provide for an extended continuous surface along the length of the belt weatherstrip regardless of whether the weatherstrip is in the retracted or extended position.

The weatherstrip also is adaptable to varying contours or curves of the transition portion by selectively adjusting the width of the weatherstrip along various portions of its length in order to follow a curvature in the transition portion 28.

Referring now to FIG. 4, there is provided an alternate embodiment of the present invention which may be advantageously used to provide a contoured show surface on the weatherstrip as may be desirable in some applications. The operative portions of the weatherstrip 110 in this embodiment are similar to the prior embodiment and thus includes a sealing lip member 152 having sealing lip 154 which member includes a transversely extending tongue portion 160. The core substrate 134 includes an inner flange 136 and a show surface flange portion 138 connected by an intermediate portion 140. As shown in phantom the intermediate leg 140 includes a bend portion 142 along its length which may be extended if necessary to accommodate a transition surface of a vehicle.

The primary difference between this and the prior embodiment is that a contoured core substrate portion 138a is provided for forming a contoured show surface. In the embodiment shown the contoured show surface may include elastomeric portions 164a and 164b which are attached to the core substrate by adhesives or extrusion thereto and the like. The upper elastomeric portion 164b includes a sealing lip member 170 which overlaps the transversely extending tongue member 160. The contoured show surface 136a may also be provided with a chrome trim strip 164c which may be attached to the contoured core substrate at its bulbous portion 138b, as is commonly known to those skilled in the art. Thus, such a construction may be utilized when a chrome trim strip or other contoured surface may be desired in a final construction.

Figure 5:
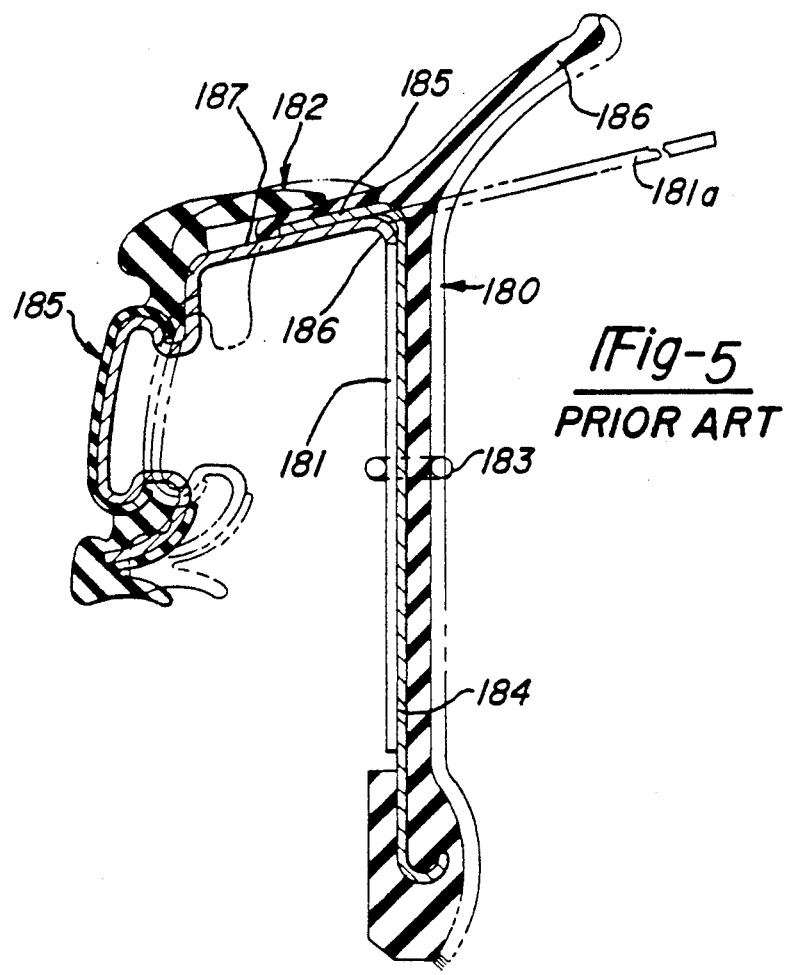
FIG. 5 is a detailed cross-sectional view showing a typical two-piece construction of the prior art.

To further illustrate the advantages and features of the present invention, a view of the prior art method of producing a weatherstrip is shown in FIG. 5. In the prior art construction a separate lip member 180 was formed to be connected to a core flange 181 of a show surface member 182 by staple 183. The lip member 180 included a core substrate 184 which had an overturned flange 185 and an outer elastomeric portion 186. The show surface core portion included the flange portion 181 which was manufactured to include the show surface elements 185 such as the contoured show surface shown. The core flange 181 during manufacturing was left straight as shown at 181a and was bent at the portion 186 to accommodate the varying contours or tapers which were necessary in a particular application.

Thus, if it was necessary to have an extended flange, the portion 181a would be bent to allow a longer intermediate leg 187 to accommodate a wider taper or the portion 181a could be bent to leave a shorter intermediate portion providing for a shorter taper or narrower weatherstrip, as shown in phantom in FIG. 5. Therefore, in the prior art in each particular application, the leg 181A would have to be bent individually to accommodate that application. Thereafter the lip member 180, which was already formed, would be attached to the show surface core by the staple 183. Not only was this a two-step process it also required separate machining and manufacturing for each particular application.

In contradistinction, the subject invention is a one-piece construction which is adjustable in its width to accommodate varying surface contours or transition tapers of a vehicle or to otherwise provide varying weatherstrip widths without a two-step assembly process and without any special machining of the leg 181a as required in the prior art. This reduces the cost of the part and also the cost of labor involved since the part may be manufactured to the same specification regardless of the final application and thereafter adapted depending on the particular application.

Figure 6:
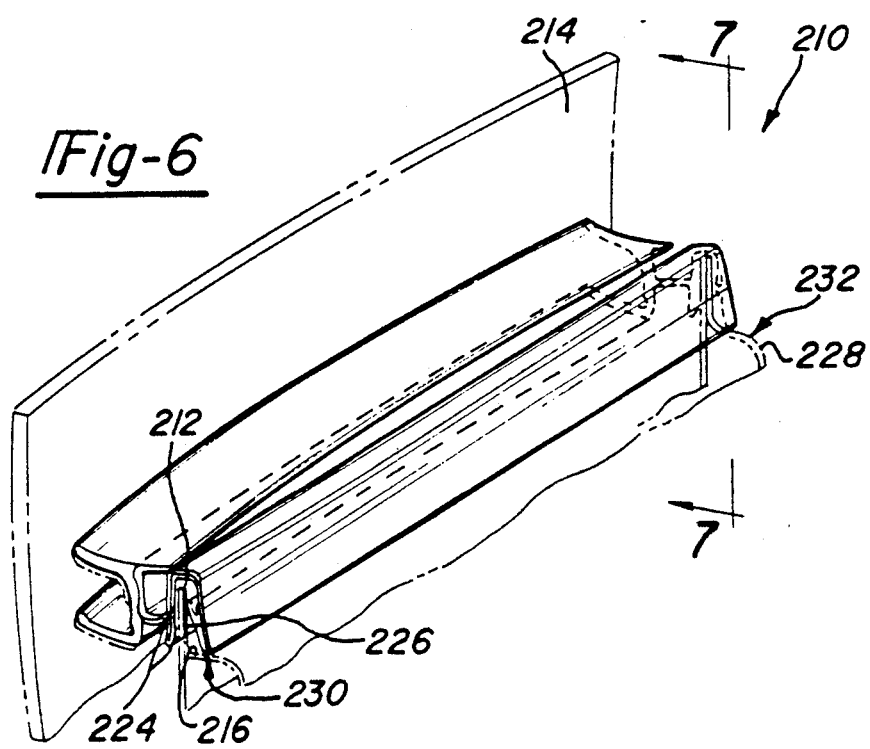
FIG. 6 is a detailed perspective view of an inner belt weatherstrip made in accordance with the teachings of the present invention for an interior door of a vehicle.
Figure 7:
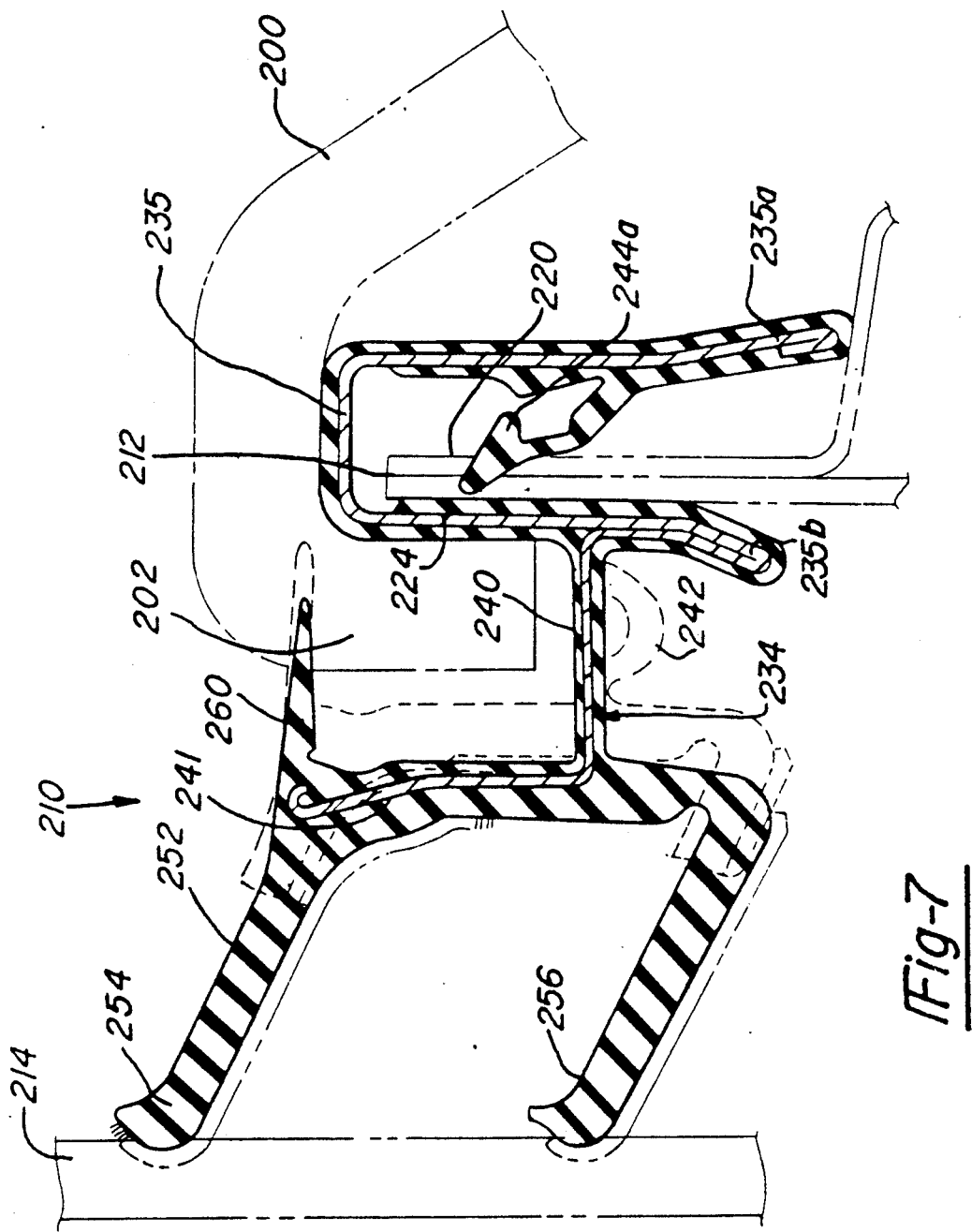
FIG. 7 is a detailed cross-sectional view of the belt weatherstrip of FIG. 6 taken along line 7—7 of FIG. 6.

Referring now to FIGS. 6 and 7, there is provided an inner belt weatherstrip of the like to be attached to the end flange 212 of the interior door of a vehicle. Generally, in the interior of a vehicle, a door panel 200 is provided which includes an overturned lip portion 202 which extends generally over the end flange area of the inner door. In the belt weatherstrip 210 of this alternate embodiment an elongated core 234 is provided which includes a securement flange portion 235 an intermediate leg portion 240 and an outermost flange 241. A sealing lip member 252 is attached to the outermost flange 241. In this embodiment of the present invention the securement flange is formed in a generally "U" shaped configuration with leg portions 235a and 235b. The core substrate is a one-piece construction and the securement leg 235b is formed by folding the sheet metal onto itself and then into the "U" shaped portion. The legs 235a and 235b are tapered away from one another at their lower ends to accommodate ease of insertion over the end flange 212. An integrally formed clip 244A is formed which engages the end flange 212 to secure the weatherstrip 210 to the end flange 212.

The sealing lips 254 and 256 are preferably integrally molded onto the core substrate along with the sealing tongue 260. Additionally, in the preferred embodiment of the invention the core substrate 234 is embedded in an elastomeric coating which also forms the attachment clip 244a.

In this embodiment of the present invention the intermediate leg 240 includes a bend portion 242 formed therein which allows the weatherstrip to accommodate for various contours of the door panel 200 or alternatively to allow varying spaces between the glass 214 and the flange portion 212 to be accommodated. Thus, the intermediate leg 240 may be expanded, to any necessary extent, at bend 242, as shown in phantom, to the expanded position (or any position therebetween) as shown in solid lines, to accommodate for varying gaps or necessary contours in a particular application. This allows the tongue portion to be properly positioned for engaging the door panel 200.

In the alternative, according to the process of the present invention, if the particular final application required, the intermediate leg 140 or 240 could be substantially straight in its manufactured condition and thereafter the bent portion 142 or 242 could be formed therein through suitable tooling to adjust the width of the weatherstrip along the length of the intermediate leg for a particular use.

Figure 8:
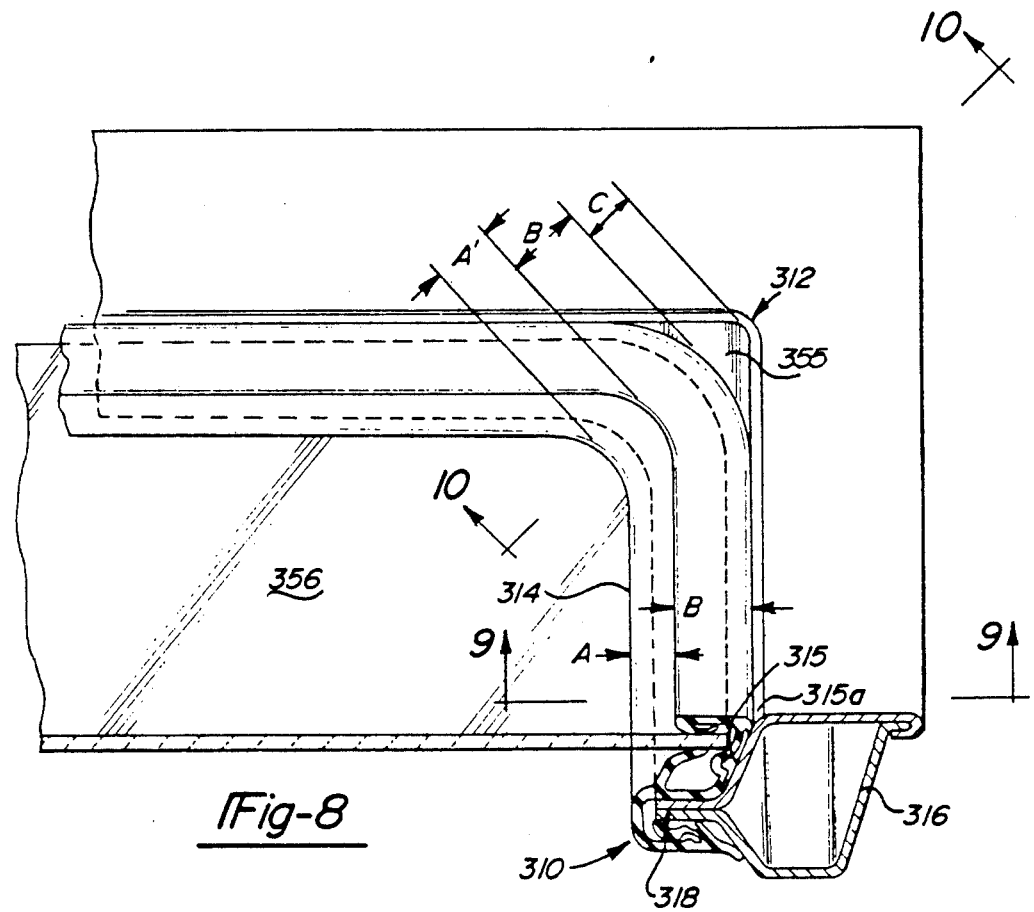
FIG. 8 is an additional view, partially broken away, of a vehicle door window aperture wherein the glass run strip of the present invention is utilized.
Figure 9:
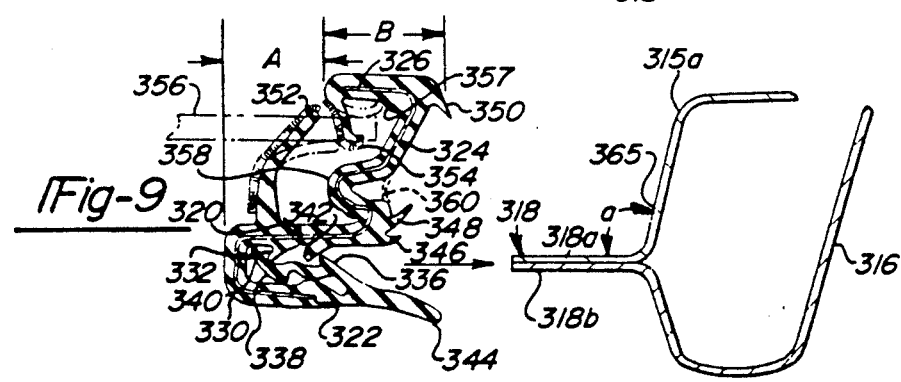
FIG. 9 is an exploded sectional view taken along line 9—9 of the vehicle door of FIG. 8 and showing the section of a glass run weatherstrip made in accordance with the teachings of the present invention.
Figure 10:
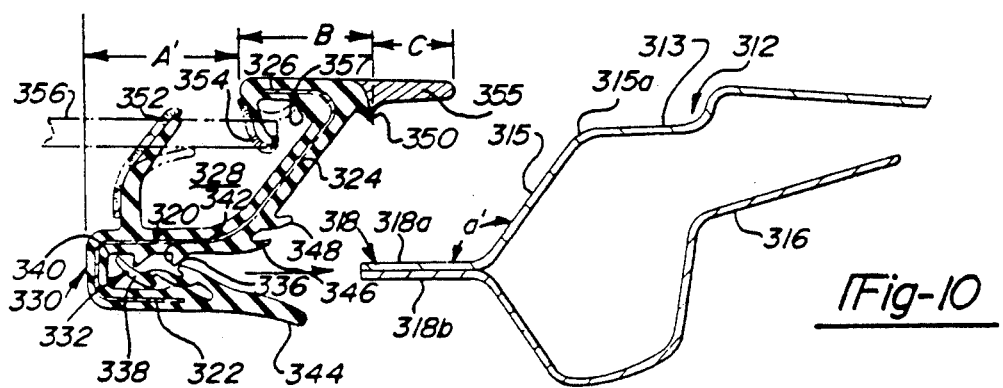
FIG. 10 is an exploded sectional view taken along line 10—10 of the vehicle door window aperture and a section of an alternate embodiment of the present invention expanded to engage the corner portion of the flange of the window aperture.

Referring now to FIGS. 8-10, there is shown an alternate embodiment of the present invention which is incorporated in a glass run weatherstrip 310.

Referring to FIG. 8, glass run weatherstrip 310 is adapted for advantageously being stretch bendable for conforming to a corner bend generally indicated at 312 of a window aperture 314 of a vehicle door 316.

The door 316 includes a window aperture 314 formed therein and includes a peripheral flange portion 318 which is formed by flanges 318a and 318b, which are commonly spot welded together. Referring now to FIGS. 9 and 10, as the belt shelf 315 progresses around the corner portion 312 the rabbit angle a gets greater progressing to angle a' at the corner 312 as shown in FIG. 10. Because of this increased angle at the corner, it is necessary to provide a glass run weatherstrip that compensates for the increased distance to reach the bend 315a at the corner portion 312 during bending of the weatherstrip.

In the past, when providing such a bend in a glass run weatherstrip, it was necessary to provide special tooling to bend the weatherstrip at the appropriate angle and thereafter use a suitable tooling to restrike the glass run weatherstrip in order to reform the strip at the corner location to provide proper clearance for the window at the corner thereof. Thus, the prior process required special tooling to reform the weatherstrip at the corner and the final product, at times, included cosmetic ripples or blemishes at the corner which were not entirely removable by the restriking process. Additionally, because there was no provisions for adjusting the width of the weatherstrip it was generally necessary to provide a prohibitive amount of material at the corner to fill in uncovered gaps such as corner shelf 313 at the corner portion 312. Thus, the final fit of the weatherstrip left some room for improvement.

The present invention solves this problem and allows forming of the glass run weatherstrip with reduced deformities at the corner portion of the bend in the glass run strip.

Glass run weatherstrip 310 includes a core substrate generally indicated at 320. Core 320 has a "U" shaped portion 322 at a first end of its width, an overturned flange 326 at the second end of its width and an intermediate leg 324 interposed therebetween. A channel 328 is generally formed by the "U" shaped end of the intermediate leg 324 and the overturned flange 326. An extruded outer covering generally indicated at 330 is extruded onto the core 320 and is made of an elastomeric material as is known in the art.

Outer covering 330 includes formed appendages as follows. A securement structure generally indicated at 332 is provided for securing of the glass run strip 310 to the vehicle door flange 318. The securement structure 332 includes a first tongue member 334 which extends into the channel formed by the "U" shaped end. A pair of lips 336 and 338 on the tongue member 334 act in cooperation with opposed lips 340 to frictionally engage the flange 318. The covering 330 also includes sealing protrusions 344, 346, 348 and 350 which provide sealing between the glass run strip and the surface portions of the door 316. Sealing lips 352 and 354 are provided which extend into channel 328 from opposite sides thereof. The sealing lips are deflectable as shown in phantom to allow passage of a glass window pane 356 therethrough during opening and closing of the window.

Referring in particular to FIG. 9, the intermediate leg 324 is provided with a bend 358 formed therein which can be straightened to provide extra width at the intermediate leg 324 where necessary. This is particularly useful in a glass run strip application wherein it is necessary to provide angles in the glass run for traversing corners of a door. The glass run construction of the present invention allows the normal position of the intermediate leg, such as shown in FIG. 8, to be expanded to the position shown in FIG. 9, to traverse the corner of the vehicle door where extra material is needed while providing the proper clearance for the window 356 in the corner portion 357 of the glass run channel 328. Thus, in the present invention, only a relatively small mold corner 355 must be added to the glass run strip 310 for filling in the distance C to cover the corner shelf 313. This provides for a lower cost in materials used and increases the aesthetic appearance at the corner 312 over the prior art weatherstrips. In an alternate embodiment a rubber or plastic web 360 may be provided to seal off the area encompassed by the bend 358, prior to lengthening the intermediate leg 324 by unbending or forming of the arcuate portion 358.

In the construction of the present invention a corner can be traversed with normal bend tooling to bend the strip and adjust the width of the strip without the necessity of use of special tooling after bending to provide clearance at the corner 312 in the corner portion 357 of the glass run channel 328.

Thus, the non-constant distance A which must be compensated for from the "U" shaped portion 322 to the lip 354 is a non-constant distance which may be adjusted to the distance A' in the present invention while the constant distance B below the lip 359 and the corner 357 remains the same to provide proper clearance for the window 356 at the corner 312 portion and to create an improved final fit for the weatherstrip.

As set forth above, the corner could also be traversed, in accordance with the process of the present invention, by providing an initially substantially straight intermediate leg 324 and providing the bend 358 at the appropriate preselected portions along its length, thereby adjusting the width, to provide the proper clearance at the corner portion. Thus, in accordance with the present invention, the weatherstrip 310 having an angular bend at the corner 312 would be formed with bend 358 on either side of the corner 312 to allow a wider width at the corner where it is needed and a narrower width as required for fitting on the belt shelf of the window aperture.

Figure 11:
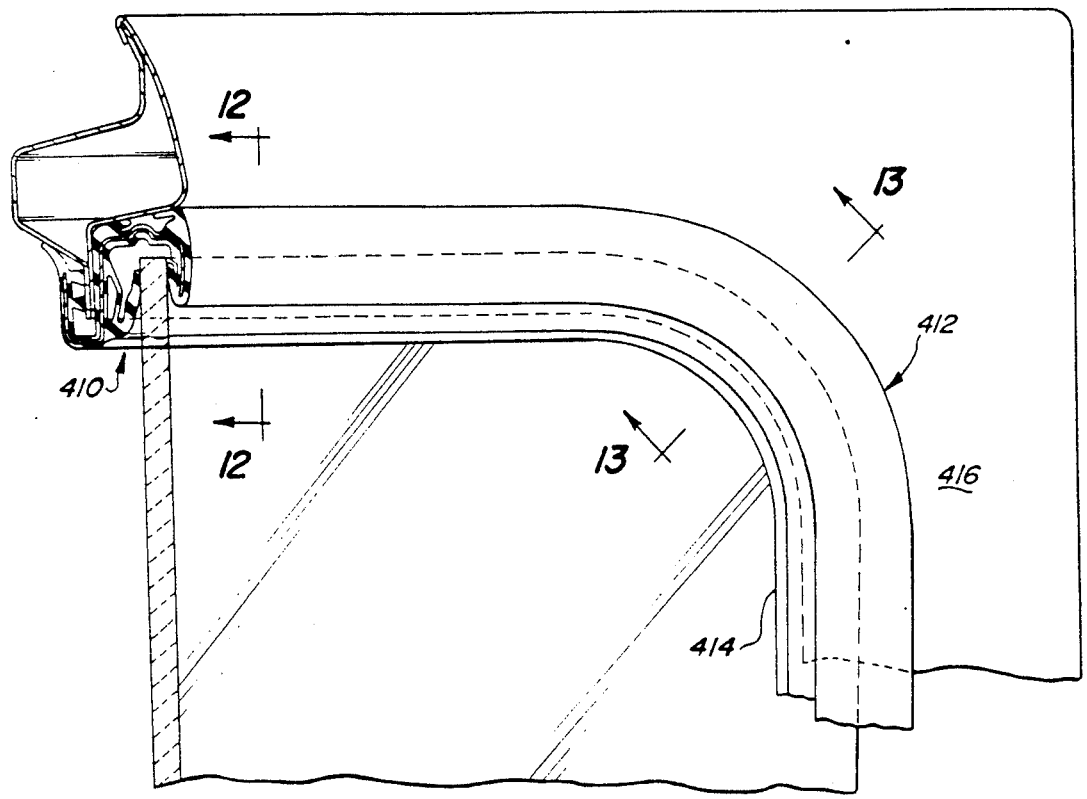
FIG. 11 is an additional side view, partially broken away, of a vehicle door window aperture, showing a corner bend wherein a constant cross-section glass run channel made in accordance with the teachings of the present invention is utilized.
Figure 12:
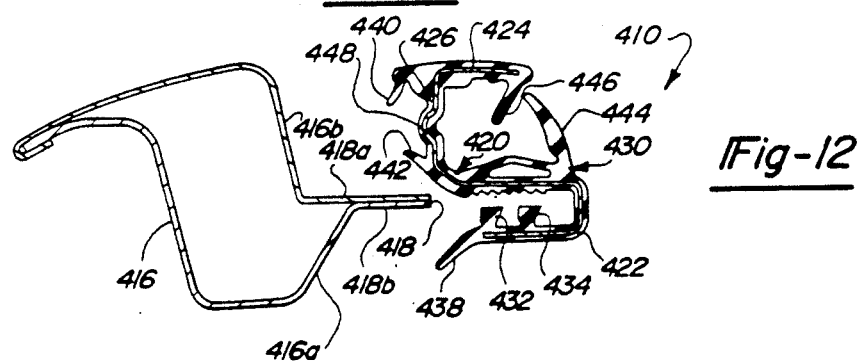
FIG. 12 is an exploded sectional view taken along line 12—12 of FIG. 11 showing a section of a constant cross-section glass run made in accordance with the teachings of the present invention.

Referring now to FIG. 11, a glass run weatherstrip 410 is adapted for being advantageously stretch bendable for conforming to a corner bend area, generally indicated at 412 of a window aperture 414 of a vehicle door 416.

The window aperture 414 is formed by peripheral flange portion 418. Flange 418 is generally formed by the flanges 418a and 418b, which are commonly spot welded together. As stated above, in certain applications the rabbit angle gets greater at the corner portion, however, in the present embodiment the weatherstrip is designed to advantageously traverse a corner wherein the rabbit angle stays substantially structures to provide a common cross-section along the entire the same. Thus, it is a goal in such weatherstrip corner structures to provide a common cross-section along the entire corner without deformation of the cross-section of the weatherstrip. In the past, the glass run strip was stretch formed in the corner area for traversing such a corner. However, in prior constructions, the material needed to stretch bend across this area was taken from the length of the glass run strip which tended to cause the glass run cross-section to distort and reduce in size during the stretch bending process. Thus, the glass run section would often have to be restruck in these areas or otherwise reworked to provide proper dimensions. The present invention allows an improved common cross-section throughout the corner portion during this stretch bending operation.

The glass run weatherstrip 410 includes a core substrate, generally indicated at 420. Core 420 has a "U" shaped portion 422 at a first end thereof, a flange 424 at the outer end and an intermediate portion 426. Thus, a "U" shape glass run channel is formed between the portion 422, intermediate leg 426 and outer flange 424. An extruded outer covering, generally indicated at 430, is extruded onto the core 430 and is made of an elastomeric material as is known in the art.

Outer covering 430 includes formed appendages as follows. A securement structure which includes securing protrusions 432 and 434 are provided which in conjunction with the serrations 436 act to secure the glass run strip 410 to the flange 418. A sealing lip portion 438 is provided at a first end for sealing to the inside shelf 416a of the door 416 on a first side thereof and sealing lip portions 440 and 442 are provided for sealing against the outer shelf 416b of the door 416. Sealing lips 444 and 446 are provided with associated flocking for sealing the slideable glass window therebetween.

Figure 13:
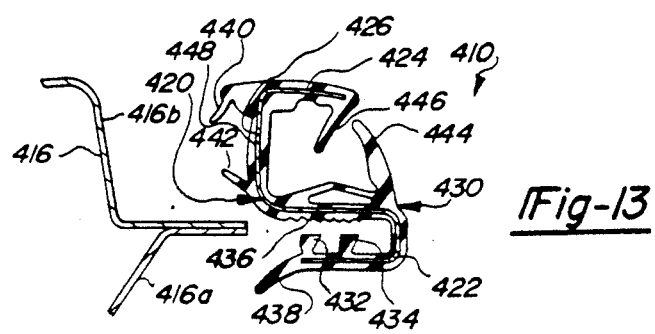
FIG. 13 is an exploded sectional view taken along line 13—13 showing a section of a constant cross-section glass run strip made in accordance with the teachings of the present invention at a corner bend of a window aperture.

The intermediate leg portion 426 of the present embodiment includes a rib or bend portion 448 along its length. Preferably, the rib or bend 448 extends in a direction away from the glass run channel, i.e. the bend is concave as to the glass run channel. The extra material provided in the width of intermediate leg 426 by bend portion 448 may be utilized when stretch bending the glass run strip 410 around the corner bend area 412 to produce a more constant cross-section at the corner bend area 412. Thus, as shown more particularly in FIG. 13 the portion 448 may be partially or totally utilized at the corner bend area 412 for providing an improved cross-section at the corner bend area 412. As can be seen in the drawings the resulting cross-section is substantially the same at the corner (FIG. 13) as it is at any other portion along its length. This is an improvement over the prior art methods in that the bend portion provides extra core material which can be utilized during the stretch bending operation, at the corner bend area, rather than taking the material solely from the length of the weatherstrip, which tended to deform the cross-section of the strip at the corner bend area.

While the above description constitutes the preferred embodiments of the present invention, it is to be appreciated that the invention is susceptible to modification, variation and change without departing from the proper scope and fair meaning of the accompanying claims.

What is claimed is:

1. An improved weatherstrip for substantially retaining a constant cross-section about a corner bend f a vehicle having a constant rabbit angle comprising:
   a central core member, said core member including a first vehicle engaging portion, an intermediate leg portion and an outer flange portion defining a predetermined cross-section;
   a means for attachment of said vehicle engaging portion to a vehicle;
   a sealing means for sealing between a first surface of the vehicle and a second surface of the vehicle; and
   a bend portion provided in said intermediate portion wherein an improved corner bend in the weatherstrip can be produced while substantially retaining said predetermined cross-section by utilizing the material at said bend for forming said one-piece weatherstrip with a constant cross-section rather than utilizing material for the length of said intermediate leg portion, thereby providing the improved cross-section at the corner portion when the weather strip is formed in a stretch bending operation.

2. The improved weatherstrip of claim 1 wherein said first vehicle engaging, portion, intermediate portion and outer flange portion define a glass run channel and aid bend extends away from said glass runchannel.

3. An improved glass run weatherstrip for substantially retaining a constant cross-section about a corner bend of a vehicle having a constant rabbit angle, said glass run weatherstrip comprising:
- a central core member, said core member including a first flange portion, an intermediate portion and a second flange portion for defining a gases run channel;
- a means for slideably sealing of a glass window in said glass run channel;
- a means for attachment of said first flange portion to a vehicle; and
- a bend portion extending in a direction away from said glass run channel in said intermediate portion for providing excess material which can be utilized when forming a corner bend by a stretch bending operation to provide a corner bend of constant cross-section in the final formed glass run weatherstrip wherein any excess material is taken from the bend portion rather than the length of the intermediate leg to provide an improved cross-section.

* * * * *

UNITED STATES PATENT AND TRADEMARK OFFICE
CERTIFICATE OF CORRECTION

PATENT NO. : 5,042,201

DATED : August 27, 1991

INVENTOR(S) : Robert A. Vaughan

It is certified that error appears in the above-identified patent and that said Letters Patent is hereby corrected as shown below:

On The Title Page - under United States Patent [19]:
"Vaughn" should be --Vaughan--

On the Title Page - Inventor: "Vaughn" should be --Vaughan--

On the Title Pate - Abstract, line 20:
"application" should be --applications--

Column 9, lines 43-44, after "substantially" delete --structures to provide a common cross-section along the entire--

Column 10, line 42, claim 1, "f" should be --of--

Column 10, line 65, claim 2, "aid" should be --said--

Column 10, line 66, claim 2, "runchannel" should be --run channel--

Signed and Sealed this

Third Day of August, 1993

Attest:

MICHAEL K. KIRK

*Attesting Officer*    *Acting Commissioner of Patents and Trademarks*